(12) United States Patent
Matsumoto et al.

(10) Patent No.: US 7,637,619 B2
(45) Date of Patent: Dec. 29, 2009

(54) LIGHT SOURCE DRIVING METHOD AND PROJECTOR

(75) Inventors: Morio Matsumoto, Matsumoto (JP); Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 652 days.

(21) Appl. No.: 10/568,948

(22) PCT Filed: Jun. 22, 2005

(86) PCT No.: PCT/JP2005/011893
§ 371 (c)(1),
(2), (4) Date: Feb. 22, 2006

(87) PCT Pub. No.: WO2006/001470
PCT Pub. Date: Jan. 5, 2006

(65) Prior Publication Data
US 2007/0002286 A1    Jan. 4, 2007

(30) Foreign Application Priority Data
Jun. 24, 2004    (JP) .............................. 2004-186355

(51) Int. Cl.
*G03B 21/20* (2006.01)
(52) U.S. Cl. .......................................... 353/85; 353/97
(58) Field of Classification Search .................... 353/85, 353/84, 97, 101, 121, 122
See application file for complete search history.

(56) References Cited

U.S. PATENT DOCUMENTS

| | | | | |
|---|---|---|---|---|
| 6,631,996 B2 * | 10/2003 | Moench et al. | ................ | 353/85 |
| 6,905,216 B2 * | 6/2005 | Stanton et al. | ................. | 353/84 |
| 6,991,336 B2 * | 1/2006 | Matsui | ......................... | 353/94 |
| 7,273,284 B2 * | 9/2007 | Deppe et al. | ................... | 353/85 |
| 7,316,483 B2 * | 1/2008 | Moench et al. | ................ | 353/85 |
| 7,329,009 B2 * | 2/2008 | Monch et al. | ................. | 353/85 |
| 7,391,475 B2 * | 6/2008 | Pate et al. | .................... | 348/602 |
| 2002/0008851 A1 | 1/2002 | Moench et al. | | |
| 2004/0150801 A1 | 8/2004 | Kitada et al. | | |

FOREIGN PATENT DOCUMENTS

| | | |
|---|---|---|
| JP | A 6-242884 | 9/1994 |
| JP | A 10-501919 | 2/1998 |
| JP | A 2000-241874 | 9/2000 |
| JP | A 2002-532867 | 10/2002 |
| JP | A-2003-156798 | 5/2003 |
| JP | A 2004-173232 | 6/2004 |

\* cited by examiner

*Primary Examiner*—William C Dowling
(74) *Attorney, Agent, or Firm*—Oliff & Berridge, PLC

(57) ABSTRACT

An object of the invention is to provide a light source driving method for supplying electric power to a light source of a projector, and to provide a projector using this light source driving method. The projector has a lamp (2) as a light source for emitting light, a lamp driving electric power control section (3) as a light source driving section for supplying electric power for operating the lamp (2), an image pickup section (7) as an image obtaining section for receiving a projected image and obtaining image data to adjust the projected image, and a synchronous signal generating section (5) for generating a signal as an operation reference. The synchronous signal generating section (5) generates a first operation signal for determining operation timing of an electric current output of the lamp driving electric power control section (3), and a second operation signal for determining operation timing for receiving the projected image and obtaining the image data by the image pickup section (7), and the lamp driving electric power control section (3) and the image pickup section (7) are synchronously operated.

4 Claims, 4 Drawing Sheets

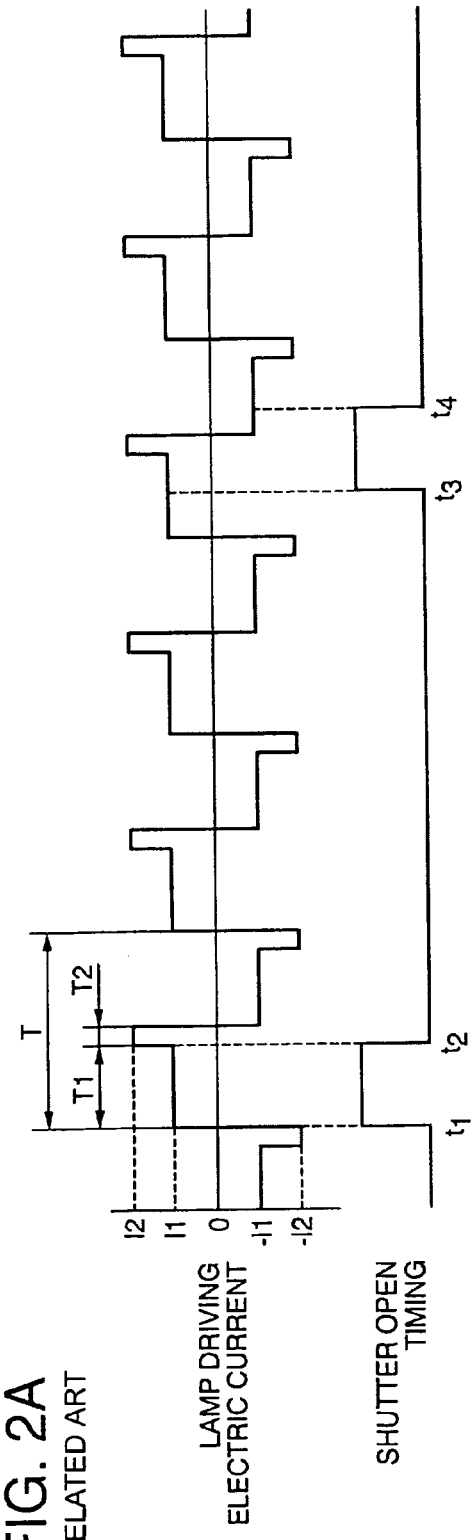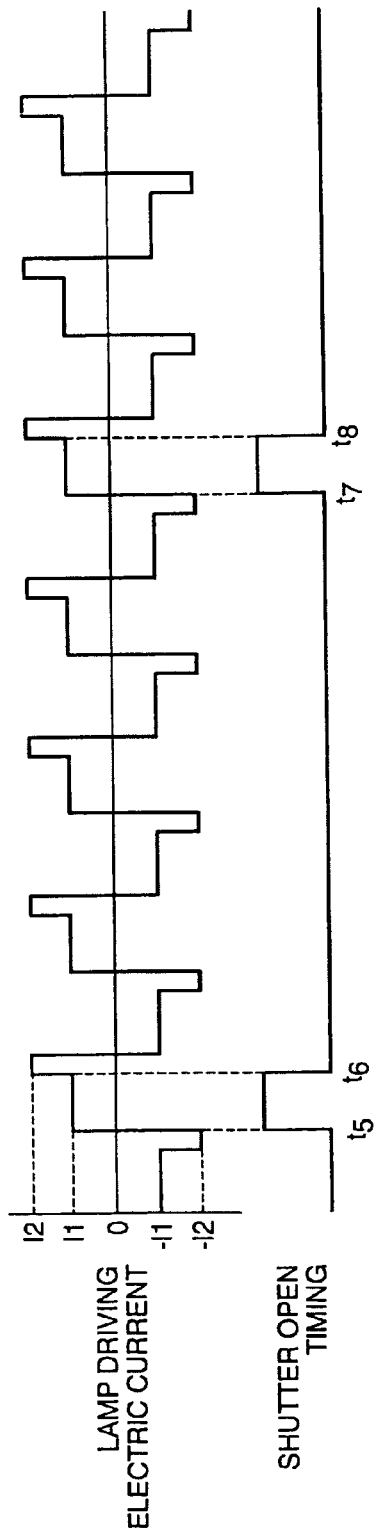

LIGHT SOURCE DRIVING METHOD AND PROJECTOR

This application claims priority from Japanese Patent Application Ser. No. 2004-186355, filed in Japan on Jun. 24, 2004, the entire disclosure of which is hereby incorporated by reference.

TECHNICAL FIELD

The present invention relates to a light source driving method for supplying electric power to a light source of a projector, and the projector using this light source driving method.

BACKGROUND ART

The light source of the projector generally emits light of high brightness by using a lamp of a discharge system. However, when the discharge of electrons between electrodes of the lamp is continued for a long time, a locus of the discharge becomes unstable and a flicker is generated in a projected image. Therefore, there is a light source driving device having a function for stabilizing the locus of the discharge and preventing the flicker by performing an operation for periodically supplying a normal electric current and a large electric current in comparison with the normal electric current on the side of the light source driving device for supplying electric power to the lamp and lighting (operating) the lamp (see patent literature 1 (FIG. 4)). Otherwise, it is also considered that a large electric current is flowed in comparison with the initial stage of the period (see patent literature 2 (FIGS. 3 to 6)).

Further, in the projector, a method for calculating a focus position by picking-up the image of a test pattern projected to a screen by a monitor camera, and detecting a high crest value of the amplitude of a horizontal signal of this picked-up photographing image (image data) is proposed as an auto focus method of the projected image (see patent literature 3).

[Patent literature 1] JP-T-10-501919
[Patent literature 2] JP-T-2002-532867
[Patent literature 3] JP-A-2000-241874

DISCLOSURE OF THE INVENTION

Problems that the Invention is to Solve

Here, when the auto focus adjustment of patent literature 3 is made by using the light source driving device for preventing the flicker of the projected image of patent literature 1, the monitor camera senses an increase of brightness caused by changing the electric current within the period of a driving waveform outputted from the light source driving device. Therefore, the flicker is generated in the picked-up image data, and the brightness of each image data becomes unstable. Accordingly, when the auto focus method using a brightness difference of the image data is used, a problem exists in that no accurate processing can be performed.

To avoid this unstableness of brightness, a method for photographing plural video images in a stopping state of a focus lens and calculating an average value is also considered and executed. However, it takes time until the focusing lens is focused, and the focus lens might be focused for a shorter time by a manual focus adjustment.

Further, the unstableness of brightness of the image data is considered and an increase and decrease judgment of the brightness difference may be also sequentially made while moving the focus lens. However, focus accuracy is greatly reduced. When no operation for periodically supplying a large electric current in comparison with the normal electric current within the period of the driving waveform is performed to avoid the unstableness of brightness of the image data, the flicker is generated in the projected image as mentioned above so that the projected image is an image not easily seen for a user seeing the projected image. Therefore, it is necessary to always perform the operation for periodically supplying a large electric current in comparison with the normal electric current within the period of the driving waveform.

The present invention is made in consideration of the above problems, and its object is to provide a light source driving method for supplying electric power to the light source of the projector, and the projector using this light source driving method.

Means for Solving the Problems

To achieve the above object, the present invention resides in a light source driving method of a projector for projecting an image, wherein synchronizing control of a driving waveform for supplying electric power to a light source, and control for receiving the projected image and obtaining image data to adjust the projected image are synchronized.

In accordance with such a light source driving method of the projector, the control of the driving waveform and the obtaining control of the image data are synchronously executed. Therefore, the projected image can be obtained in timing having no influence with respect to various driving waveforms for supplying the electric power to the light source.

In accordance with a preferable mode of the present invention, the light source driving method of the projector comprises a synchronous signal generating process for generating a signal as an operation reference, and a light source driving section for supplying the electric power for operating the light source and an image obtaining section for receiving the projected image and obtaining the image data to adjust the projected image are operated in synchronization with the signal generated in the synchronous signal generating process.

In accordance with such a light source driving method of the projector, in the synchronous signal generating process, the signal as an operation reference is generated and the light source driving section and the image obtaining section are operated in synchronization with this signal. Therefore, the image obtaining section can obtain the projected image in timing in which each image data is not influenced with respect to various output electric currents of the light source driving section.

In accordance with a preferable mode of the present invention, in the light source driving method of the projector, the image obtaining section obtains the image data in a period of the same driving waveform in synchronization with the control of the driving waveform for supplying the electric power to the light source, and the light source driving section changes an electric current while lighting the light source after the image obtaining section obtains the image data.

In accordance with such a light source driving method of the projector, the image obtaining section can obtain the image data in the period of the same driving waveform by synchronizing the operation of the image obtaining section with the control of the driving waveform. The light source driving section can change the electric current while lighting the light source after the image obtaining section obtains the image data. Thus, for example, a discharge locus is stabilized with respect to electrodes of the light source and a flicker of the projected image can be prevented by operating the light source by changing the electric current to a high electric current in comparison with the electric current in an obtaining state of the image data after the image data are obtained. Further, the electric current to be changed can be also set to another required electric current value as well as the high electric current and can be changed. Therefore, the electric current can be changed by confirming the influence of the electric current value with respect to the specification and performance of the light source, the performance of another optical system, the quality of the projected image, etc.

With respect to the image data to be obtained, the image data are obtained in the period of the same driving waveform in synchronization with the control of the driving waveform before the electric current is changed. Thus, the image data of stable brightness can be obtained.

Further, to achieve the above object, the present invention resides in a projector for projecting an image, wherein control of a driving waveform for supplying electric power to a light source and control for receiving the projected image and obtaining image data to adjust the projected image are synchronized.

In accordance with such a projector, the control of the driving waveform and the obtaining control of the image data are synchronously executed. Therefore, the projected image can be obtained in timing having no influence with respect to various driving waveforms for supplying the electric power to the light source.

In accordance with a preferable mode of the present invention, the projector for projecting an image comprises:
a light source for emitting light;
a light source driving section for supplying the electric power for operating the light source;
an image obtaining section for receiving the projected image and obtaining the image data to adjust the projected image; and
a synchronous signal generating section for generating a signal as an operation reference; and
the synchronous signal generating section generates a first operation signal for determining operation timing of an electric current output of the light source driving section, and a second operation signal for determining operation timing for receiving the projected image and obtaining the image data by the image obtaining section, and the light source driving section and the image obtaining section are synchronously operated.

In accordance with such a projector, light is emitted by the light source and the light source driving section supplies the electric power for operating the light source. The image obtaining section receives the projected image and obtains the image data to adjust the projected image. Further, the synchronous signal generating section generates the signal as an operation reference. The synchronous signal generating section generates the first operation signal for determining the operation timing of the electric current output of the light source driving section, and the second operation signal for determining the operation timing for receiving the projected image and obtaining the image data by the image obtaining section so that the light source driving section and the image obtaining section can be synchronously operated. Therefore, the image obtaining section can obtain the projected image in timing in which no image data are influenced with respect to various output electric currents of the light source driving section. Accordingly, the brightness of each image data picked up by the image obtaining section can be constantly set, and the projected image can be accurately adjusted.

Further, in accordance with a preferable mode of the present invention, in the projector for projecting an image, the image obtaining section obtains the image data in a period of the same driving waveform in synchronization with the control of the driving waveform for supplying the electric power to the light source, and the light source driving section changes an electric current while lighting the light source after the image obtaining section obtains the image data In accordance with such a projector, the image obtaining section can obtain the image data in the period of the same driving waveform by synchronizing the operation of the image obtaining section with the control of the driving waveform. The light source driving section can change the electric current while lighting the light source after the image obtaining section obtains the image data. Thus, for example, the discharge locus is stabilized with respect to electrodes of the light source and the flicker of the projected image can be prevented by operating the light source by changing the electric current to a high electric current in comparison with the electric current in an obtaining state of the image data after the image data are obtained. Further, the electric current to be changed can be also set to another required electric current value as well as the high electric current and can be changed. Therefore, the electric current can be changed by confirming the influence of the electric current value with respect to the specification and performance of the light source, the performance of another optical system, the quality of the projected image, etc.

With respect to the obtained image data, the image data are obtained in the period of the same driving waveform in synchronization with the control of the driving waveform before the electric current is changed. Thus, the image data of stable brightness can be obtained.

Further advantageous embodiments and improvements of the invention are listed in the dependent claims. Hereinafter, the invention will be described with reference to its preferred embodiments and with reference to the attached drawings as briefly mentioned below.

BRIEF DESCRIPTION OF THE DRAWINGS

FIG. 2 is a view for comparing the prior art and this embodiment mode with respect to a lamp driving electric current waveform and shutter open timing.

BEST MODE FOR CARRYING OUT THE INVENTION

The preferred embodiment of the present invention will next be explained on the basis of the drawings.

EMBODIMENT MODE

Figure 1:
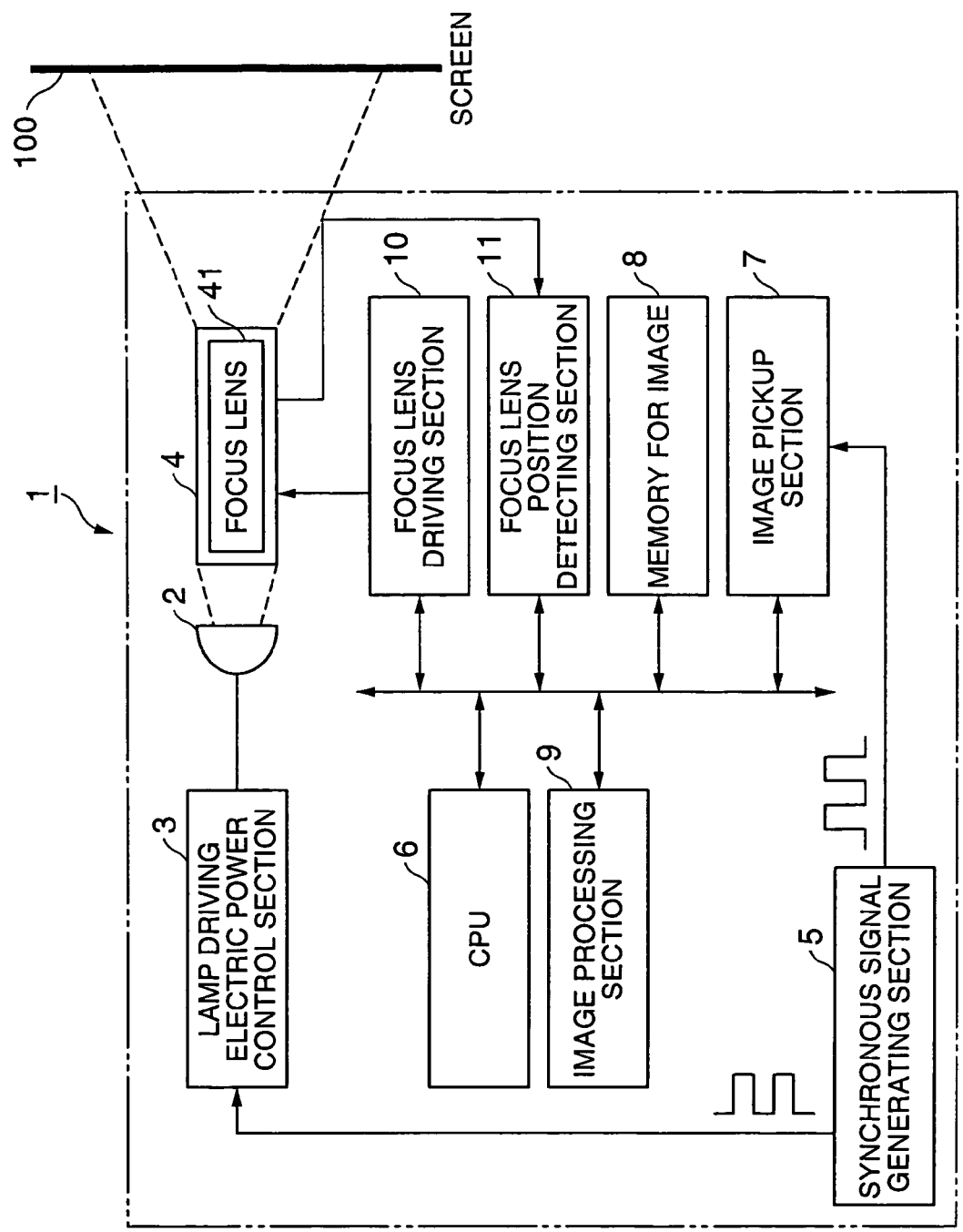
FIG. 1 is a schematic constructional view of a projector in accordance with an embodiment mode of the present invention.

FIG. 1 is a schematic constructional view when an auto focus adjustment is made by using a synchronous signal generating section for synchronizing the operation of a lamp driving electric power control section as a light source driving section and the operation of an image pickup section as an image obtaining section in a projector.

The construction of the projector 1 will be explained by using FIG. 1.

The projector 1 has a lamp 2 as a light source for emitting light, a lamp driving electric power control section 3 as a light source driving section for supplying electric power to the lamp 2, an unillustrated optical system for performing polarization conversion, color separation, modulation and synthesis with respect to the emitted light of the lamp 2, and a projecting lens 4 for enlarging and projecting synthetic light. The projector 1 projects an image as the synthetic light to a screen 100 arranged in a wall, etc.

The projector 1 has a clock generator constituting a synchronous signal generating section 5, and generates a reference signal for operating the lamp driving electric power control section 3 and an image pickup section 7 described later in synchronization with each other in accordance with their specifications. Concretely, the synchronous signal generating section 5 generates a first operating signal for determining operation timing of an electric current output with respect to the lamp driving electric power control section 3, and also generates a second operating signal for determining operation timing for receiving a projected image and obtaining image data with respect to the image pickup section 7 (described later). The synchronous signal generating section 5 also generates a signal as an operation reference of a CPU (Central Processing Unit) 6 for controlling the entire operation of the projector 1.

As a construction for making the auto focus adjustment, the projector 1 has the image pickup section 7 for picking-up the image projected to the screen 100, a memory 8 for an image for storing the picked-up image as image data, and an image processing section 9 for analyzing these image data. The projector 1 also has a focus lens 41 constituting the projecting lens 4 for focusing the projected image, a focus lens driving section 10 for moving the focus lens 41, and a focus lens position detecting section 11 for detecting the position of the focus lens 41.

In this embodiment mode, a CCD (Charge Coupled Device) camera is adopted as the image pickup section 7, and is arranged on the projecting side front face of the projector main body. Further, a rotary encoder of a photoelectric type is adopted as the focus lens position detecting section 11, and detects the position (moving distance) of the focus lens 41. The focus lens driving section 10 moves the focus lens 41 by adopting a DC (direct current) motor. These controls are performed by the CPU 6.

An explanation with respect to the auto focus adjustment based on the construction of FIG. 1 will be made in detail in FIG. 4.

FIG. 2 is a view for comparing the prior art and this embodiment mode with respect to a lamp driving electric current waveform of a lamp driving electric power control section and shutter open timing of the image pickup section. The difference between the prior art and this embodiment mode-will next be explained by using FIG. 2.

FIG. 2(a) is a view showing the lamp driving electric current and timing for picking-up the projected image by the image pickup section in the conventional case in which the lamp driving electric power control section and the image pickup section are operated by non-synchronous separate signals. Here, in the lamp driving electric current, the abscissa axis direction shows time and the ordinate axis direction shows an output electric current. The output electric current is an alternating electric current, and their polarities are repeatedly inverted (+/−) in a period T. More particularly, an electric current I1 as a driving electric current according to the specification of the lamp 2 is outputted for time T1. Just before the electric current is switched from + to −, a large electric current (hereinafter called a high electric current) I2 obtained by adding an additional value to the electric current I1 is outputted during an instant time T2. This output pattern is also executed on the minus side, and +/− is repeatedly outputted as one period T, and the electric current is supplied to the lamp 2.

At this time, when the projected image is picked up by the CCD camera as the image pickup section 7, the shutter of the CCD camera is opened during the time interval from time t1 to time t2 simultaneously with rising of the electric current I1 of the lamp driving electric current as shown in FIG. 2 as shutter open timing. The next shutter open timing of the projected image using the CCD camera becomes the time interval from time t3 to time t4, and a different electric current waveform with respect to the lamp driving electric current waveform in the previous shutter open timing is formed. Thus, when the lamp driving electric power control section 3 and the image pickup section 7 are operated by non-synchronous separate signals, the waveform of the lamp driving electric current with respect to the shutter open timing of the image pickup section 7 is not constant, and the high electric current I2 enters the shutter open period and does not enter the shutter open period in accordance with cases. Thus, the brightness of the image data picked up by the image pickup section 7 becomes unstable.

FIG. 2(b) is a view showing the lamp driving electric current and timing for picking-up the projected image by the image pickup section when the lamp driving electric power control section and the image pickup section of this embodiment mode are synchronously operated by using the synchronous signal generating section.

At this time, when the projected image is picked up by the CCD camera, the shutter of the CCD camera is opened during the time interval from time t5 to time t6 in synchronization with rising of the electric current I1 of the lamp driving electric current as shown in FIG. 2(b) as the shutter open timing. The time t6 is synchronized with an output start (rising) of the high electric current I2 of the lamp driving electric current. The next shutter open timing of the projected image using the CCD camera becomes the time interval from time t7 to time t8. Similar to the lamp driving electric current waveform in the previous shutter open timing, timing synchronized with the rising of the electric current I1 of the lamp driving electric current and synchronized with the rising of the operation of the high electric current I2 is attained.

Thus, when the lamp driving electric power control section 3 and the image pickup section 7 are synchronously operated, the waveform of the lamp driving electric current with respect to the shutter open timing of the image pickup section 7 is always constant. Therefore, the light amount fetched to the image data picked up by the image pickup section 7 becomes constant so that the brightness of each image data can be stabilized.

FIG. 3 is a view for comparing the prior art and this embodiment mode with respect to the brightness difference of the image data obtained by picking-up the projected image by the image pickup section when the auto focus adjustment is made. FIG. 3 also shows the brightness difference of the image data picked up by the image pickup section with respect to the axis of time when the focus lens is moved at an constant speed from a focusing position closer to the lens than the screen 100 to a focusing position further than the screen 100.

The change of the brightness difference of the image data picked up by the image pickup section will be explained by using FIG. 3 in the conventional case for operating the lamp driving electric power control section 3 and the image pickup section 7 by non-synchronous separate signals (the case shown in FIG. 2(a)), and the case for synchronously operating the lamp driving electric power control section 3 and the image pickup section 7 by using the synchronous signal generating section 5 (the case shown in FIG. 2(b)) as shown in FIG. 2.

Figure 3A:
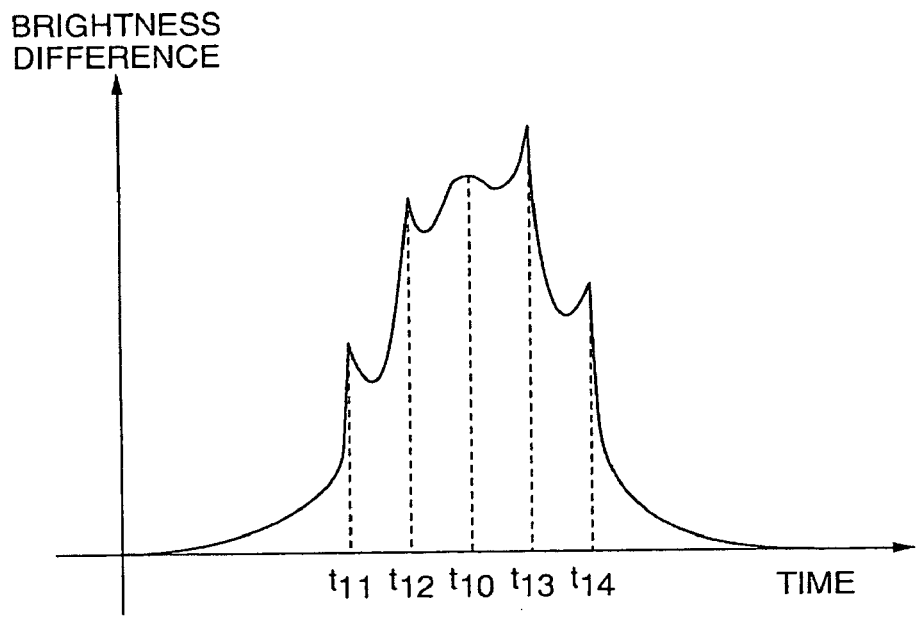
FIG. 3 is a view for comparing the prior art and this embodiment mode with respect to a brightness difference of image data.
Figure 3B:
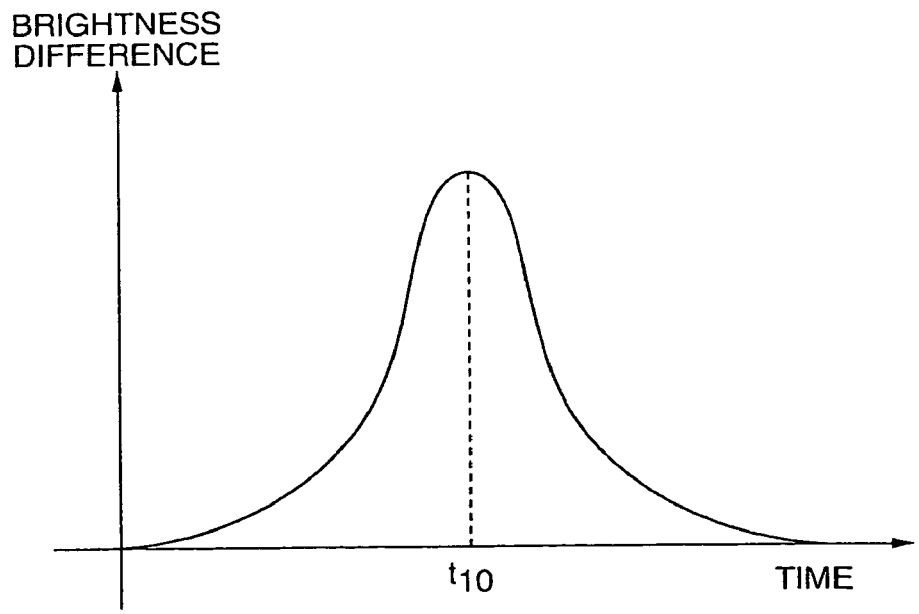

FIG. 3(a) is a view showing the brightness difference of the image data in the conventional case in which the lamp driving electric power control section and the image pickup section are operated by non-synchronous separate signals. FIG. 3(b) is a view showing the brightness difference of the image data when the lamp driving electric power control section and the image pickup section are operated by synchronous separate signals (the above first and second signals) generated by the synchronous signal generating section 5.

In FIG. 3(a), in the conventional case in which the lamp driving electric power control section 3 and the image pickup section 7 are operated by non-synchronous separate signals, no light receiving amount fetched to each image data picked up during the movement of the focus lens 41 becomes about constant. Therefore, peaks of the brightness difference provided by the image of a relatively high light receiving amount picked up in timing including a moment instantaneously lighted by the lamp 2 in a flicker preventing countermeasure are generated at random in portions shown by times t11, t12, t13, t14 within FIG. 3(a). Therefore, when the CPU 6 judges a maximum value of the sum total of the brightness difference on the basis of an analyzing result in the image processing section 9, no CPU 6 can judge whether it is a focusing position or not. Therefore, it affects the accuracy of the auto focus adjustment. The position of t10 within FIG. 3(a) is a focusing position.

In FIG. 3(b), when the lamp driving electric power control section 3 and the image pickup section 7 are synchronously operated by using the synchronous signal generating section 5, the light receiving amount fetched to each image data picked up during the movement of the focus lens 41 approximately becomes equal. Therefore, the brightness of the image data is stabilized and the change of the brightness difference with respect to the focus lens position (time) also becomes a uniform curve with the focusing position t10 as a peak as shown in FIG. 3(b). Therefore, in the change of the brightness difference, the brightness difference gradually rises when the focus lens begins to be focused. The brightness difference becomes maximum in the focusing position t10, and is gradually reduced when it is defocused.

Thus, when the auto focus adjustment is made, the lamp driving electric power control section 3 and the image pickup section 7 are synchronously operated by using the synchronous signal generating section 5. Thus, the change of the uniform brightness difference shown in FIG. 3(b) is obtained and the auto focus adjustment is accurately made.

Figure 4:
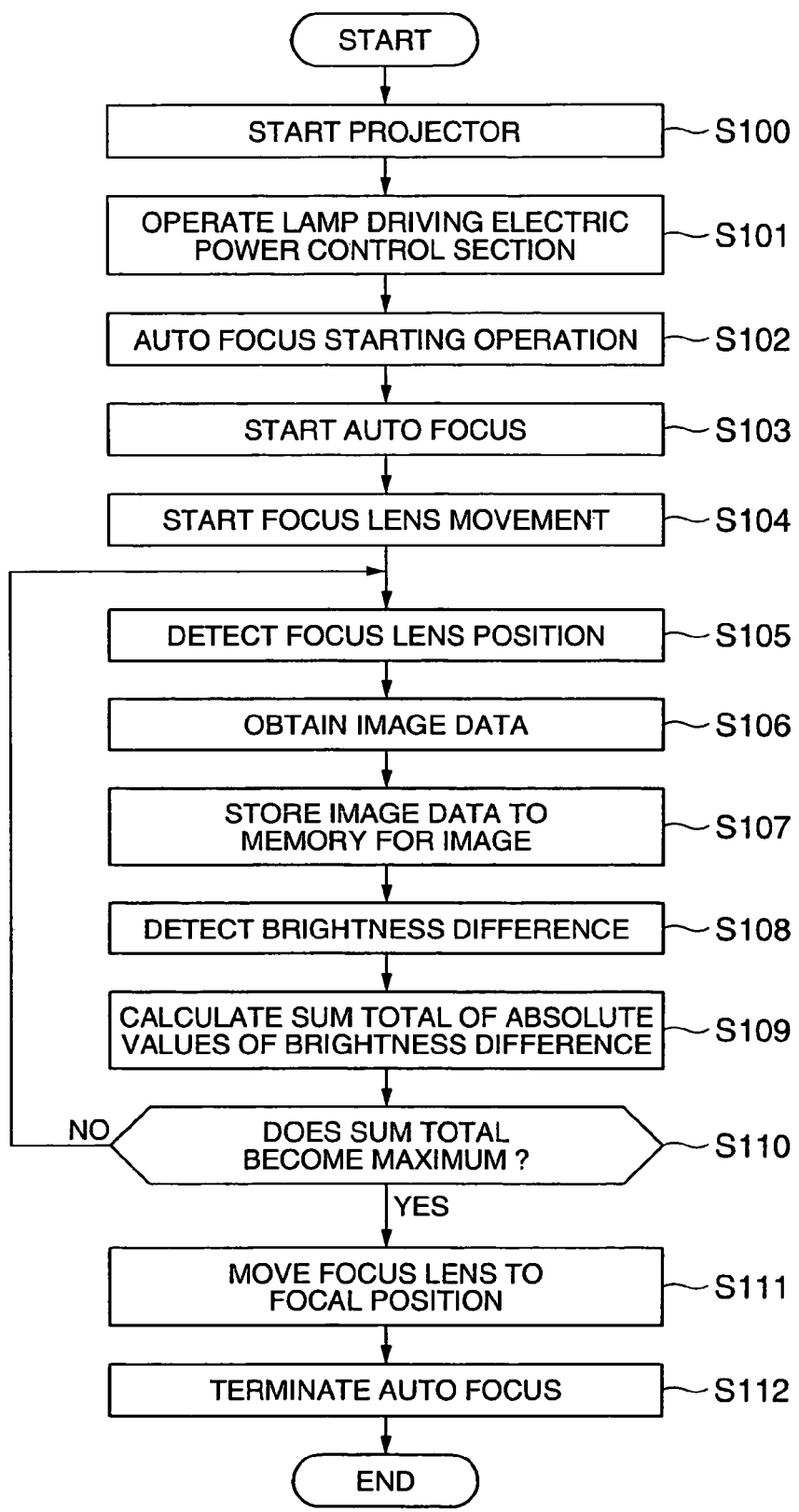
FIG. 4 is a flow chart of the projector when an auto focus adjustment is made.

FIG. 4 is a flow chart when the auto focus adjustment is made by using the construction of FIG. 1 of this embodiment mode. The auto focus adjustment will be explained by using FIGS. 4 and 1.

In a step S100, a user performs an input operation by an un-illustrated input section arranged in the projector 1 and the CPU 6 receives its operation signal and the projector 1 is started. In a step S101, the CPU 6 sends a signal for operating the lamp driving electric power control section 3 to emit light from the lamp 2. The lamp driving electric power control section 3 receives this signal, and starts an electric current output of driving waveforms constructed by an electric current I1 and a high electric current I2 in synchronization with a signal (first operation signal) generated by the synchronous signal generating section 5. The lamp 2 starts the light emission by the supply of the output electric current from the lamp driving electric power control section 3 (similarly to the lamp driving waveform shown in FIG. 2).

In a step S102, the user performs an input operation for making the auto focus adjustment from the input section arranged in the projector 1 and the CPU 6 receives its operation signal and the auto focus adjustment is started.

In a step S103, the CPU 6 projects a pattern for focus for the auto focus adjustment to the screen 100 by the projecting lens 4, and the auto focus adjustment is started. The CPU 6 then projects the pattern for focus for the auto focus adjustment to the screen 100 by the projecting lens 4.

In this embodiment mode, an image having a stripe pattern constructed by arranging plural black straight lines on the plane of a white image is used as the pattern for focus in this embodiment mode.

An auto focus adjusting method in this embodiment mode will be explained in a step after a step S104.

In the step S104, the focus lens driving section 10 starts the operation of the focus lens 41 from a focusing position at a near distance from the screen 100. In a step S105, the focus lens position detecting section 11 detects the position of the focus lens 41. In a step S106, the CCD camera as the image pickup section 7 picks up the pattern for focus as a projected image in the focus lens position detected in position in synchronization with a signal (second operation signal) generated by the synchronous signal generating section 5, and obtains this pattern as image data. In a step S107, the image data of the picked-up pattern for focus are stored to the memory 8 for an image.

In a step S108, the image processing section 9 detects the brightness difference of an adjacent pixel with respect to all pixels of one image data on the basis of the image data stored to the memory 8 for an image. In a step S109, the CPU 6 calculates the sum total of absolute values of the brightness difference on the basis of the detected brightness difference. In a step S110, the CPU 6 compares the calculating result with the previous image data, and judges whether the sum total of this time is smaller than that of the previous time or not (whether the sum total of the previous time becomes maximum or not). Here, when the sum total of this time is not smaller than that of the previous time, it again proceeds to the step S105 and the operation is performed from the position detection of the focus lens 41. Steps from the step S105 to the step S110 are then repeated until it is judged in the step S110 that the sum total of the absolute values of the brightness difference is smaller than the sum total of the previous time. Thus, the focus lens position providing a maximum sum total of the absolute values of the brightness difference is searched.

When the CPU 6 judges that the sum total of the absolute values of the brightness difference of this time is smaller than that of the previous time (the sum total of the previous time becomes maximum) in the step S110, the CPU 6 judges that the focus lens position with respect to the image data of the previous time is a focusing position. At this time point, the focus lens driving section 10 stops the movement of the focus lens 41 by a signal of the CPU 6. It then proceeds to a step S111, and the CPU 6 moves the focus lens 41 by operating the focus lens driving section 10 so as to attain the focused focus lens position of the previous time. Thus, it proceeds to a step S112 and the auto focus adjustment is terminated.

The auto focus adjustment is made by this series of flow charts.

In FIG. 4, a synchronous signal generating process corresponds to a process for synchronizing driving timing of the lamp driving electric power control section 3 and image pickup timing of the image pickup section 7 in each of steps S101 and S106. Further, a light source driving process corresponds to a process for outputting an electric current in accordance with the synchronized driving timing of the lamp driving electric power control section 3.

The following effects are obtained in accordance with the above embodiment mode.

(1) When the auto focus adjustment is conventionally made, the brightness of the image data is dispersed. Therefore, when the maximum value of the sum total of the absolute values of the brightness difference is compared and judged, plural image data are required every measuring portion of the focus lens position. The dispersion of the brightness is smoothed and the sum total of the brightness difference is calculated by analyzing these image data and calculating its average value. However, in accordance with the projector 1 of this embodiment mode, the lamp driving electric power control section 3 and the image pickup section 7 can be operated in synchronization with each other by using the synchronous signal generating section 5 for generating signals (first and second operation signals) as a reference of the operation. Therefore, a shutter open time of the image pickup section 7 and a lamp driving electric current waveform corresponding to this shutter open time can be synchronized with each other. Thus, the brightness of the image data picked up by the image pickup section 7 can be always constantly set. Therefore, it is not necessary to consider the dispersion of the brightness between the image data so that the auto focus adjustment can be accurately made.

(2) When the auto focus adjustment is conventionally made, plural image data are required every measuring portion of the focus lens position. However, in accordance with the projector 1 of this embodiment mode, the image data of constant brightness are obtained. Therefore, it is sufficient to set the number of image data required every measuring portion to one so that the auto focus adjustment can be made at high speed.

(3) When the auto focus adjustment is conventionally made, the high electric current I2 for stabilizing the discharge locus between electrodes of the lamp 2 and preventing the flicker of the projected image affects the brightness of the image data picked up in the image pickup section. However, in accordance with the projector 1 of this embodiment mode, the shutter open time of the image pickup section 7 and the lamp driving electric current waveform of the lamp driving electric power control section 3 can be synchronized with each other by using the synchronous signal generating section 5. Therefore, since the shutter open time can be synchronized with the period of a driving waveform for outputting the electric current I1, the brightness of the image data can be always constantly set. Further, since the lamp driving electric current waveform can be always synchronized even when the shutter open time is set to the fetch timing of the high electric current I2, the brightness of the image data can be always constantly set. Accordingly, the auto focus adjustment can be made without considering the influence of the high electric current I2.

The present invention is not limited to the above embodiment mode, but can be variously changed, improved, etc. in the above embodiment mode. Modified examples will next be described.

MODIFIED EXAMPLE 1

In the above embodiment mode, the reference signal of the lamp driving electric power control section 3 is set by using the projector 1 and the clock generator as a reference signal of the image pickup section 7 constituting the projector 1. However, the synchronous signal generating section may be also constructed by using the clock generator arranged in the lamp driving electric power control section 3 to set the reference signal of the image pickup section 7.

MODIFIED EXAMPLE 2

In the above embodiment mode, the explanation is made by using the driving waveform provided by adding the high electric current I2 for stabilizing the discharge locus between the electrodes of the lamp 2 and preventing the flicker of the projected image. However, the present invention can be also applied to a case in which only the driving waveform of the electric current I1 is used without adding the high electric current I2. In this case, the auto focus adjustment also considering the influence of brightness, etc. on the image data due to the change of polarities of the output electric current is made by synchronizing the shutter open time of the image pickup section 7 and the lamp driving electric current waveform of the lamp driving electric power control section 3. Accordingly, a further accurate adjustment can be made with respect to the auto focus adjustment in the driving waveform provided by an alternating electric current using only the electric current I1.

MODIFIED EXAMPLE 3

In the above embodiment mode, the electric current is changed to the uniform high electric current I2 while the light source is lighted after the image data for the auto focus adjustment are obtained. However, the present invention is not limited to this case, but the electric current may be also changed to an un-uniform electric current value. In this case, the changed electric current value can be set by confirming the influence of the electric current value with respect to the specification and performance of the light source, the performance of another optical system and the quality of the projected image, etc.

MODIFIED EXAMPLE 4

In the above embodiment mode, the image pickup section 7 is constructed by using the CCD camera as an obtaining section for adjusting the projected image, and the auto focus adjustment is made. However, the present invention is not limited to this construction, but the light receiving section may be also constructed by using a light receiving element as the obtaining section, and the projected light amount of the projected image may be measured and the brightness adjustment of the projected image may be also made. Thus, when the light receiving amount is larger than a predetermined value, the projector 1 performs a control operation for reducing the brightness of the lamp 2 and can adjust the projected image to the projected image of a light amount easily seen for a user since the projected light amount is excessively large. In this case, similar to the above embodiment mode, the fetch timing of the light amount of the light receiving element and the lamp driving electric current waveform are synchronized with each other by arranging the synchronous signal generating section 5 for generating the synchronous signal of the lamp driving electric power control section 3 and the light receiving element as the obtaining section. Therefore, it is possible to obtain a stable light amount having no dispersion due to the lamp driving electric current in the fetch light amount of the light receiving element.

MODIFIED EXAMPLE 5

In the above embodiment mode, the auto focus adjustment is made by using the projector 1 having the synchronous signal generating section 5 for generating the synchronous signal of the lamp driving electric power control section 3 and the image pickup section 7. However, the present invention is not limited to this construction, but an auto zoom adjustment may be also made.

When the auto zoom adjustment is made, the focus lens 41 shown in FIG. 1 is changed to a zoom lens and the focus lens driving section 10 is changed to a zoom lens driving section, and the focus lens position detecting section 11 is changed to a zoom lens position detecting section. The auto zoom adjustment can be made by this changing construction. Concretely, the projecting lens 4 projects a pattern for zoom and the image pickup section 7 picks up its projected image, and the image processing section 9 detects the brightness difference with respect to all pixels on the basis of its image data. On the basis of its detecting result, the CPU 6 respectively judges the range of the pattern for zoom and the outer shape of the screen 100 by predetermined threshold values. When the outer shape of the screen 100 lies within the pattern for zoom, the CPU 6 calculates the moving amount of the zoom lens and operates the zoom lens driving section and the zoom lens position detecting section and moves the zoom lens so that the auto zoom adjustment is made.

Since the synchronous signal generating section 5 generates the synchronous signal of the lamp driving electric power control section 3 and the image pickup section 7, there is no dispersion of brightness in the image data in which the pattern for zoom is picked up. Therefore, stable image data can be fetched and the auto zoom adjustment can be accurately made at high speed.

MODIFIED EXAMPLE 6

The auto focus adjustment and the auto zoom adjustment are made by arranging the synchronous signal generating section 5 for generating the synchronous signal of the lamp driving electric power control section 3 and the image pickup section 7 by the above embodiment mode. Therefore, the present invention can be also used in a trapezoidal distortion correction of the projected image. Concretely, when the trapezoidal distortion is generated, the distance and the angle of the projector 1 with respect to the screen 100 can be calculated by the auto focus adjustment. The trapezoidal distortion correction is made by adding a correction using the auto zoom adjustment to these distance and angle. At this time, since the brightness of each image data picked up by the image pickup section 7 is stabilized, an accurate trapezoidal distortion correction can be made at high speed.

MODIFIED EXAMPLE 7

The projector 1 having the synchronous signal generating section 5 for generating the synchronous signal of the lamp driving electric power control section 3 and the image pickup section 7 in the above embodiment mode is a projector of a transmission type liquid crystal system. However, the present invention is not limited to this projector, but can be also executed in a projector adopting a DLP (registered trademark) (Digital Light Processing) system and a LCOS (Liquid Crystal On Silicon) system as a reflection type liquid crystal system, etc. Thus, when the auto focus adjustment and the auto zoom adjustment, etc. are made with respect to the projectors adopting various systems, the lamp driving electric current waveform of the lamp driving electric power control section 3 and the shutter open timing of the image pickup section 7 can be synchronized with each other so that image data not flickered in brightness can be obtained.

MODIFIED EXAMPLE 8

In the above embodiment mode, the picked-up image data can be set to stable brightness having no flicker at the auto focus adjusting time since the synchronous signal generating section 5 for generating the synchronous signal of the lamp driving electric power control section 3 and the image pickup section 7 is arranged. However, the present invention is not limited to the auto focus adjustment, but can be also used in e.g., a case for executing a color correcting function with respect to the projected object face in which each color (red, green, blue, white, black, etc.) is projected to an unspecific projected object face such as a wall, etc., and the difference between this color and the original color with respect to the color of this projected object face is detected, and a reverse correction is made and light is projected, etc. Thus, although plural image data are conventionally required by the dispersion of brightness, it is sufficient to set one image data in the present invention so that the executing speed of the color correcting function with respect to the projected object face can be improved.

MODIFIED EXAMPLE 9

In the above first embodiment mode, the sum total of absolute values of adjacent brightness differences with respect to all the pixels of the image data is calculated as the auto focus adjusting method. However, the present invention is not limited to this method. For example, a specific pixel may be set instead of all the pixels of the image data, but the sum total of the absolute values of the adjacent brightness differences may be also calculated with respect to only this specific pixel. Thus, the auto focus adjustment of a higher speed can be made.

Further, a method for setting the position of the focus lens 41 for simply maximizing the brightness of a lightest portion in the image data to a focusing position may be also used as the auto focus adjusting method. Otherwise, a method for setting the position of the focus lens 41 for maximizing the brightness difference between a lightest portion and a darkest portion in the image data or its ratio to a focusing position may be also used. Otherwise, a method for setting the position of the focus lens 41 for maximizing the sum total of powers of the absolute values of the brightness differences of the adjacent pixels of the image data to a focusing position may be also used.

As explained above, various focus adjusting methods can be used.

The invention claimed is:

1. A light source driving method for a projector that projects an image, comprising:
    generating, via a synchronous signal generating process, a signal as an operation reference signal;
    generating a first synchronous signal to determine operation timing of an electric current output of a light source;
    generating a second operation signal to determine operation timing for receiving the projected image;
    obtaining image data, to adjust the projected image, in a period of the same driving waveform in synchronization with the control of the driving waveform for supplying electric power to the light source; and
    changing an electric current while lighting the light source after obtaining the image data.
2. The light source driving method of the projector according to claim 1,
    the projector including a light source driving section for supplying the electric power for operating the light source, and an image obtaining section for receiving the projected image and obtaining the image data to adjust the projected image;

the method further comprising operating the light source driving section and the image obtaining section in synchronization with the signal generated in the synchronous signal generating process.

3. A projector for projecting an image, comprising:

a light source that emits light;

a light source driving section that supplies electric power to operate the light source;

an image obtaining section that receives the projected image and obtains the image data to adjust the projected image; and a synchronous signal generating section that generates a signal as an operation reference, the synchronous signal generating section generating a first operation signal to determine operation timing of an electric current output of the light source driving section, and a second operation signal to determine operation timing for receiving the projected image and obtaining the image data by the image obtaining section, the light source driving section and the image obtaining section being synchronously operated, the image obtaining section obtaining the image data in a period of the same driving waveform in synchronization with the control of the driving waveform for supplying the electric power to the light source, and the light source driving section changing an electric current while lighting the light source after the image obtaining section obtains the image data.

4. The projector according to claim 3, further comprising:

a controller that synchronizes the control of the driving waveform for supplying electric power to the light source with control of receiving the projected image and obtaining the image data to adjust the projected image.

* * * * *